US009654279B2

(12) United States Patent
Michiels et al.

(10) Patent No.: US 9,654,279 B2
(45) Date of Patent: May 16, 2017

(54) SECURITY MODULE FOR SECURE FUNCTION EXECUTION ON UNTRUSTED PLATFORM

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 47 days.

(21) Appl. No.: 14/220,321

(22) Filed: Mar. 20, 2014

(65) Prior Publication Data
US 2015/0270951 A1   Sep. 24, 2015

(51) Int. Cl.
H04L 9/00       (2006.01)
H04L 29/06      (2006.01)

(52) U.S. Cl.
CPC .......... H04L 9/002 (2013.01); H04L 63/1466 (2013.01); H04L 2209/16 (2013.01); H04L 2209/24 (2013.01)

(58) Field of Classification Search
CPC ..... H04L 9/06; H04L 9/30; H04L 9/18; H04L 9/00; G06F 7/725
USPC .......................................................... 380/28
See application file for complete search history.

(56) References Cited

U.S. PATENT DOCUMENTS

| 8,510,726 | B2* | 8/2013 | Eisen | G06F 8/51 717/162 |
| 2005/0021989 | A1* | 1/2005 | Johnson et al. | 713/194 |
| 2005/0039025 | A1* | 2/2005 | Main et al. | 713/182 |
| 2007/0014394 | A1 | 1/2007 | Harder et al. | |
| 2007/0086586 | A1* | 4/2007 | Jakubowski et al. | 380/28 |
| 2009/0254759 | A1* | 10/2009 | Michiels et al. | 713/189 |
| 2009/0313480 | A1* | 12/2009 | Michiels | G06F 21/10 713/187 |
| 2010/0080395 | A1* | 4/2010 | Michiels et al. | 380/278 |
| 2011/0067012 | A1* | 3/2011 | Eisen et al. | 717/140 |
| 2012/0093313 | A1* | 4/2012 | Michiels | 380/255 |
| 2012/0170740 | A1* | 7/2012 | Lee et al. | 380/44 |

OTHER PUBLICATIONS

Wyseur, Brecht "White-Box Cryptography: Hiding Keys In Software", NAGRA Kudelski Group, Apr. 2012.*
"Syncrosoft MCFACT—Secure Data Processing Technology", Retrust Sixth Quarterly Meeting, Mar. 11, 2008, Villach, Austria, 108 pages.

(Continued)

Primary Examiner — Harunur Rashid
Assistant Examiner — Wayne An

(57) ABSTRACT

A method of performing a secure function on data inputs by a security module, including: receiving an encrypted data value by the security module; decrypting the encrypted data value using a white-box decryption block cipher and encoding the decrypted data value, wherein the data value is invisible to an attacker; performing a function on the encoded data value and producing an encoded result of the function, wherein the data value and the result are invisible to the attacker; decoding the encoded result of the programmed function and then encrypting the result using a white-box encryption block cipher, wherein the result is invisible to the attacker.

25 Claims, 3 Drawing Sheets

(56) References Cited

OTHER PUBLICATIONS

Chow, Stanley et al., "A White-Box DES Implementation for DRM Applications", Digital Rights Management: ACM CCS-9 Workshop, DRM 2002, Washington, D.C., USA, Nov. 18, 2002, 1-16.
Chow, Stanley et al., "White-Box Cryptography and an AES Implementation", Cryptography: 9th Annual International Workshop, SAC 2002, St. John's, Newfoundland, Canada, Aug. 15, 2002.
Billet, et al., "Cryptanalysis of a White Box AES Implementation", Lecture Notes in Computer Science, vol. 3357, Jan. 1, 2004, 227-240.
Chow, "White-Box Cryptography and an AES Implementation", Cryptography: 9th Annual International Workshop, SAC 2002, St. John's , Newfoundland, Canada, Aug. 15, 2002.
Muir, "A Tutorial on White-Box AES", International Association for Cryptologic Research, vol. 20130228:053134, Feb. 28, 2013, 1-25.
Lepoint et al., "Another Nail in The Coffin of White-Box AES Implementations", International Association for Cryptologic Research, vol. 20130723:130134, Jul. 22, 2013.

\* cited by examiner

SECURITY MODULE FOR SECURE FUNCTION EXECUTION ON UNTRUSTED PLATFORM

TECHNICAL FIELD

Various exemplary embodiments disclosed herein relate generally to a security module for secure function execution on an untrusted platform.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Security modules that may include secure software applications that may be called upon to carry out various functions such as, for example, cryptographic functions used to protect and authenticate digital content. In order to counter attacks, these algorithms may be obfuscated (hidden) in order to prevent reverse engineering and modification of the algorithm or prohibit obtaining the user-specific secure information. Accordingly, the functions of the secure software application may be carried out by various functions. For example, one way to obscure these functions is by the use of lookup tables.

Content providers must deliver content to legitimate users across a hostile network to a community where not all users or devices can be trusted. This has lead to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

Two main areas of vulnerability of digital rights management relying on encryption include the software modules which enforce the terms and conditions under which the content may be used, and the key distribution and handling. Typically, the software module enforces the terms and conditions under which the content is to be used. An attacker aiming to bypass these terms and conditions may attempt to achieve this through tampering of the program code of the software module.

Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of DRM and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure function that performs cryptographic functions in an environment where an attacker has complete control of the system performing the white-box cryptography function. Typically, such a white-box cryptography function may be carried out using software on a processor, but may also be carried out by dedicated hardware circuits that implement the various functionality of the white-box cryptography function. Thus, the attacker can modify inputs and outputs, track the operations of the secure function, sample and monitor memory used by the secure function at any time, and even modify the software in a software implementation. Accordingly, the secure functions need to be carried out in a manner that prevents the disclosure of secret information used in the secure function. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties. Accordingly, for many devices it is important that certain functions may be executed securely.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to receiving an encrypted data value by the security module; decrypting the encrypted data value using a white-box decryption block cipher and encoding the decrypted data value, wherein the data value is invisible to an attacker; performing a function on the encoded data value and producing an encoded result of the function, wherein the data value and the result are invisible to the attacker; decoding the encoded result of the programmed function and then encrypting the result using a white-box encryption block cipher, wherein the result is invisible to the attacker.

Further, various exemplary embodiments relate to a security module for performing a secure function, including: a white-box decryption module configured to: receive an encrypted data value; decrypt the encrypted data; and encode the decrypted data value, wherein the data value is invisible to an attacker; a memory configured to store encoded data; a program function module configured to: perform a function on the data value and produce an encoded result of the function, wherein the data value and the result are invisible to the attacker; and a white-box encryption module configured to: decode the encoded result of the programmed function; and encrypt the result, wherein the result is invisible to the attacker.

Further, various exemplary embodiments relate to a non-transitory machine-readable storage medium encoded with instructions for execution by a security module for performing a secure function on data inputs, the non-transitory machine-readable storage medium, comprising: instructions for receiving an encrypted data value by the security module; instructions for decrypting the encrypted data value using a white-box decryption block cipher and encoding the decrypted data value, wherein the data value is invisible to an attacker; instructions for performing a function on the encoded data value and producing an encoded result of the function, wherein the data value and the result are invisible to the attacker; instructions for decoding the encoded result of the programmed function and then encrypting the result using a white-box encryption block cipher, wherein the result is invisible to the attacker.

Further, various exemplary embodiments relate to a method of producing an implementation of a cryptographic operation for performing a secure function on data inputs by a security module, including: producing a white-box implementation of a decryption operation that receives an encrypted data value, that decrypts the encrypted data value, and that encodes the decrypted data value, wherein the data value is invisible to an attacker; implementing a function on the encoded data value that produces an encoded result of the function, wherein the data value and the result are invisible to the attacker; and producing a white-box implementation of an encryption operation that receives the encoded result, that decodes the encoded result, and that encrypts the result, wherein the data value is invisible to an attacker.

Various embodiments are described wherein performing a function on the encoded data value further includes decoding the encoded data value, performing the function on the data value, and encoding the result of the function.

Various embodiments are described wherein the encrypted data value is received from an external source, and further comprising sending the encrypted result to the external source.

Various embodiments are described wherein the encrypted data value is received from a memory in the security module, and further comprising storing the encrypted result in the memory.

Various embodiments are described wherein the white-box encryption block cipher and the white-box decryption block cipher use Advance Encryption Standard cryptography.

Various embodiments are described wherein the white-box encryption block cipher and the white-box decryption block cipher use Data Encryption Standard cryptography.

Various embodiments are described wherein the white-box encryption block cipher and the white-box decryption block cipher comprise a plurality of lookup tables.

Various embodiments are described wherein the lookup tables are hardware lookup tables.

Various embodiments are described wherein the lookup tables are software lookup tables stored in a memory and the white-box encryption block cipher and the white-box decryption block cipher are implemented on a processor.

Various embodiments are described wherein the white-box encryption block cipher and the white-box decryption block cipher comprise a plurality of finite state machines.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In the deployment of secure software, it is desirable to carry out various operations in a manner that prevents a white-box attacker from determining the values and results of the operations. Accordingly, embodiments of a practical software architecture for enabling a secure execution of a function P in this white-box attack model is described below.

Figure 1:
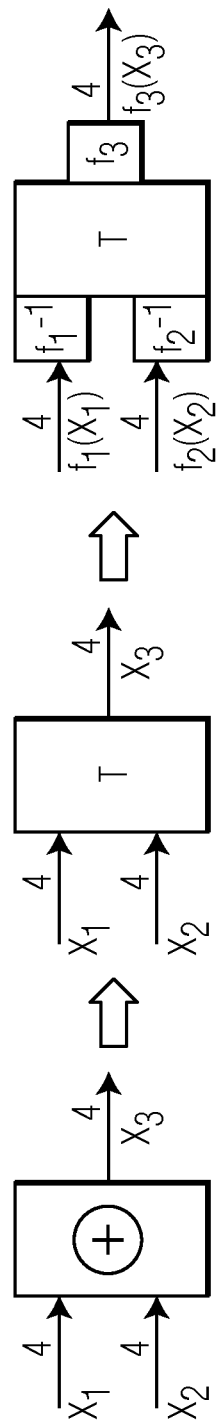
FIG. 1A illustrates an implementation of a XOR of two nibbles resulting in an output nibble.
FIG. 1B illustrates a lookup table with an 8 bit input and a 4 bit output to implement the XOR of FIG. 1A.
FIG. 1C illustrates the lookup table of FIG. 1B with the addition of input and output encodings to obscure the inputs and output.

White-box implementations of secure software implementing a cryptographic function often encode all values stored in memory and then operations are implemented such that they operate on these encoded values resulting in no clear values being observable. A way to accomplish this is by using lookup tables. FIG. 1A illustrates an implementation of a XOR of two nibbles $x_1$ and $x_2$ (i.e., 4 bits) resulting in an output nibble $x_3$. FIG. 1B illustrates a lookup table with an 8 bit input of $x_1$ and $x_2$ and a 4 bit output $x_3$ to implement the XOR of FIG. 1A. FIG. 1C illustrates the lookup table of FIG. 1B with the addition of input and output encodings to obscure the inputs $x_1$ and $x_2$ and output $x_3$. If the two input nibbles $x_1$ and $x_2$ are encoded by functions $f_1(x_1)$ and $f_2(x_2)$ and the output $x_3$ should be encoded by $f_3(x_3)$, then the input decodings and output encoding may be merged into the XOR table as indicated in FIG. 1C. In the resulting lookup table of FIG. 1C, the clear values $x_1$, $x_2$, and $x_3$ are no longer visible.

Figure 2:
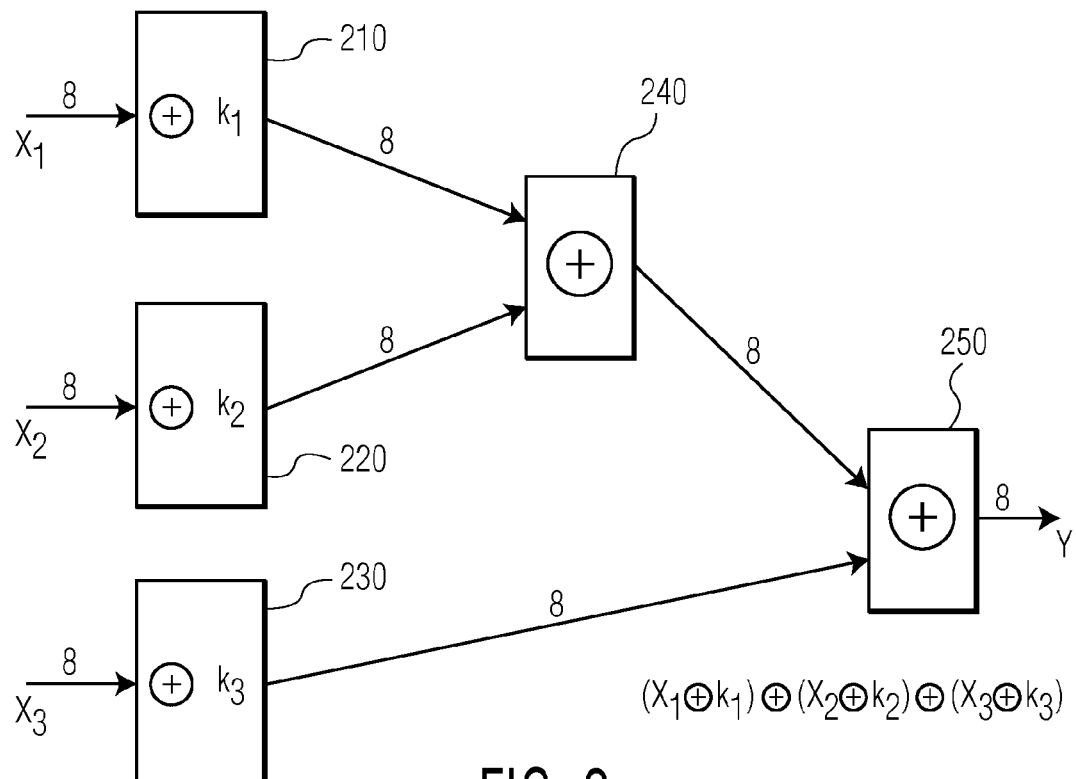
FIG. 2 illustrates an implementation of a hash-function.
Figure 3:
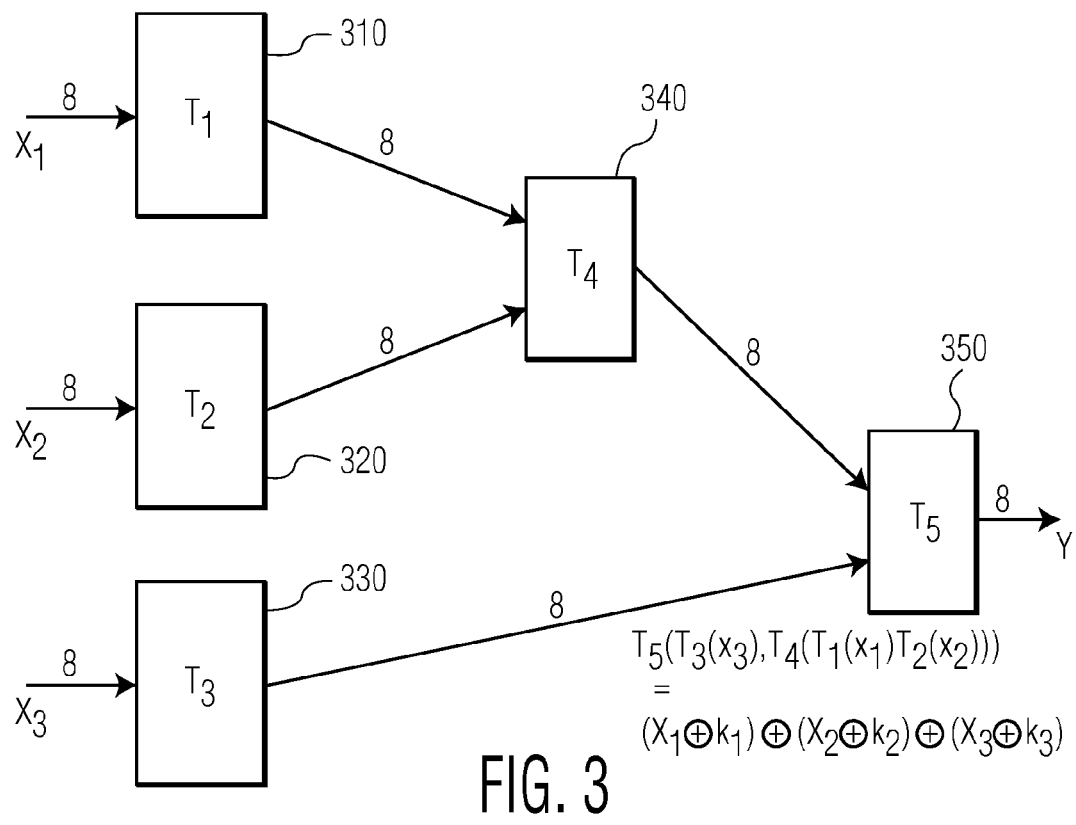
FIG. 3 shows the hash-function implemented as a network of lookup tables.

FIG. 2 illustrates an implementation of a hash-function. The hash-function 200 receives a three byte input $(x_1, x_2, x_3)$ and a three byte $(k_1, k_2, k_3)$ key. First, the key is XORed with the input 210, 220, 230. Next, the resulting 3 bytes are XORed with each other 240, 250 resulting in an output Y. FIG. 3 next shows the hash-function implemented as a network of lookup tables. Lookup tables 310, 320, 330, 340, and 350 correspond to the XOR functions 210, 220, 230, 240, and 250 of FIG. 2. The lookup tables 310, 320, 330 receive the input and XOR the input with the key. The outputs of lookup tables 310 and 320 are XORed by table 340, and the result is then input to table 350 along with the output of table 330. Table 350 XORs the inputs resulting in the output of the hash-function Y.

Figure 4:
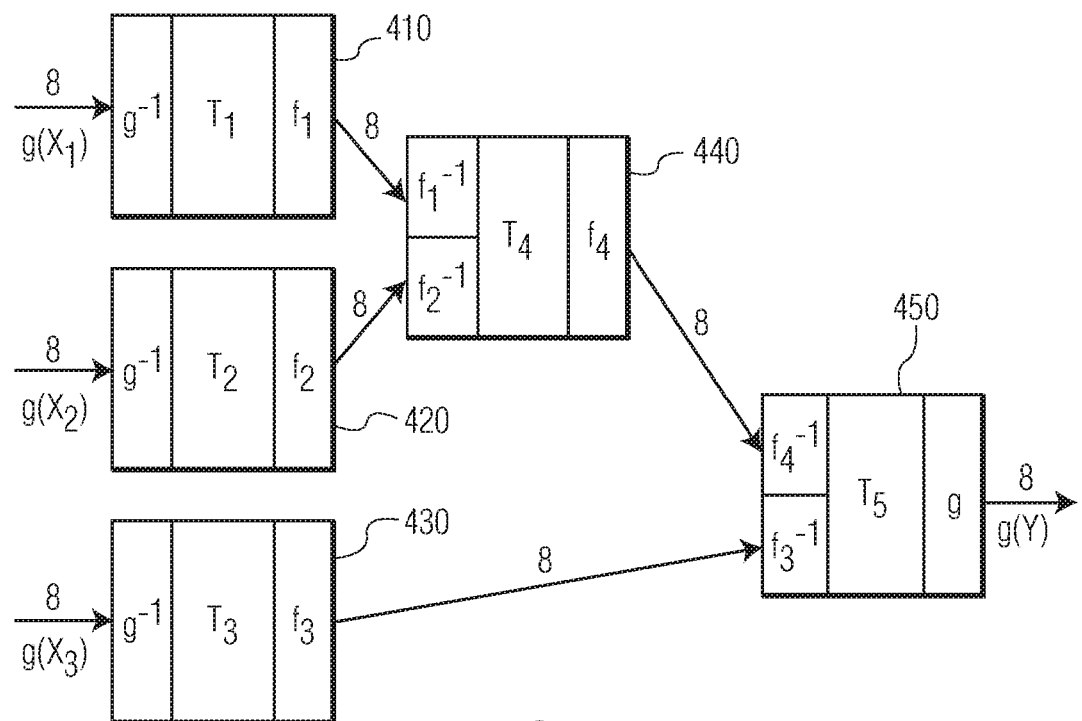
FIG. 4 illustrates the encoding of the input and output of the lookup tables of FIG. 3.

FIG. 4 illustrates the encoding of the input and output of the lookup tables of FIG. 3. This is done in such a way that the output encoding of one table matches the input encoding assumed in the next tables. Encoded lookup tables 410, 420, 430, 440, and 450 correspond to lookup tables 310, 320, 330, 340, and 350 of FIG. 3. The encoded lookup tables function the same as their respective table in FIG. 3 with the addition of input decoding and output encoding which may be built into the lookup table. The input may be byte-wise encoded by encoding function g(x). The outputs of hash-key XOR tables 410, 420, 430 may be encoded by functions $f_1$, $f_2$, and $f_3$. As the XOR table 440 receives inputs from hash-key XOR tables 410 and 420, XOR table 440 must decode the inputs received and then encode the output using function $f_4$. Again, these encoding functions may be incorporated in the lookup table. Likewise, the XOR table 450 functions like the XOR table 440. The result is an encoded output g(Y).

In the examples described above, all encoding functions are chosen to be different from one another. By using a constant encoding, table-based implementations of operations may be reused to implement the overall hash-function. For instance, in FIG. 4 the obfuscated XOR lookup tables 440 and 450 become the same. In order to keep the lookup tables small, an operation may be split into multiple smaller operations. For example, a byte XOR may be written as two nibble XORs.

The examples of secure functions described above have problems when a value is imported or exported from the secure function. A first problem includes the fact that the internal encodings cannot be used for protecting the values outside the function. A second problem includes the fact that once a value is imported (or exported), care must be used in applying (or removing) the internal encodings to (from) these input and output values because these encodings are weak, especially, when the attacker may have information on the underlying values.

Further, the values typically are encoded in small block sizes because otherwise the operations also have to operate on these large block sizes greatly increasing the size and complexity of the lookup tables. However, by choosing small block sizes for the encoding, security is decreased. Such small block sizes mean the operation is more vulnerable to a chosen-plaintext attack. To illustrate this, suppose that a secret byte is encoded by an encoding function f. Accordingly, this encoding is fully specified by all its $2^8=256$ input-output pairs (x,f(x)). Hence, it can trivially be broken by a chosen plaintext attack of only 256 plaintexts.

Figure 5:
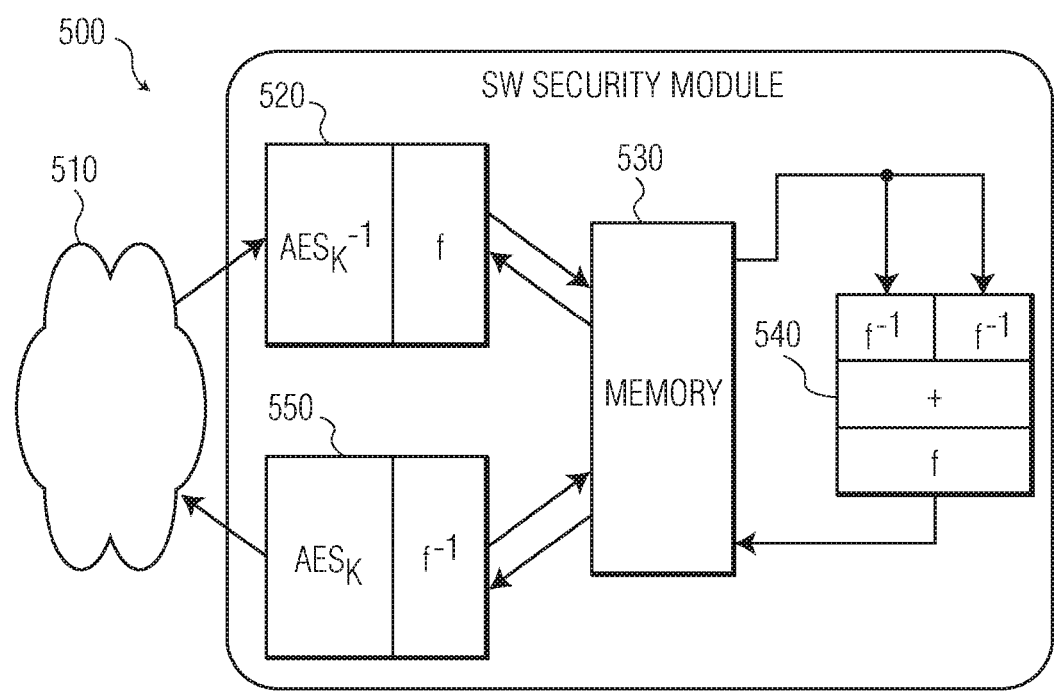
FIG. 5 illustrates an embodiment of a security module for secure execution of a function on an untrusted platform.

FIG. 5 illustrates an embodiment of a security module for secure execution of a function on an untrusted platform. In this embodiment, all values related to a function P are always encoded and invisible to an attacker, that is, the values are never in the clear. If an operation is performed, the decoding of the input and encoding of the output is integrated with the operation such that the clear value is hard to extract and is invisible to an attacker. In this situation, the values associated with the operations may be encoded using small block sizes in order to reduce the size of the lookup tables. Further, it is beneficial that the encodings used are different for different users. Therefore, if an attacker has been successful in finding the internal encodings in one implementation, the attacker would not automatically also know the internal encodings of other implementations. In other words, the encodings should stay locally in the implementation and not to be used outside it.

The security module 500 is described in the embodiment below as software implemented on a processor. The security module includes memory 530 as further described below. The security module 500 may also be implemented totally in hardware. The various modules in the security module may be implemented by logic circuits to carry out the desired function. The security module 500 may also be as a combination of hardware and software including multiple processors that might be used to implement various modules of the security module. Further, the various modules of the security module may be implemented as lookup tables, finite state machines, or using obfuscated software.

Further the use of the term module is intended to mean an implementation that includes hardware. Such hardware may be a logic circuit that performs a specified function or could also be a processor that runs software implemented to carry out the secure function.

To overcome the problems described above, a table-based white-box implementation of a conventional block cipher may be used at the input and output of the program P to be secured. Preferably, a cipher with a block size of at least 50 bits may be used to provide security. A white-box implementation is an implementation of a cipher for which it is hard to extract to underlying key by a white-box attack. A table-based white-box implementation is well suited for being merged with other functions. That is, the table-based white-box implementation may be extended to compute a combination of multiple functions, such that it is hard to derive the clear intermediate values between the functions. The white-box implementation of a block cipher is used as follows.

In FIG. 5, a security module 500 may receive an encrypted input value x from an external source 510. This external source 510 encrypts the desired input value x and supplies the encrypted x value to the white-box decryption block cipher 520. For example, the white-box block decryption cipher 520 may implement the Advance Encryption Standard (AES) or Data Encryption Standard (DES) block cipher with a key known to the external source providing input to the software security module 500. Other block ciphers may also be implemented in as the white-box decryption block cipher 520. Further, the white-box decryption block cipher 520 encodes the input value x using an encoding function f. The encoding function f may operate on the whole value of x or on individual portions of x, for example, such as individual bytes. The encoded value f(x) may then be stored in memory. In a like manner any input values x may be received in encrypted form, then decrypted and encoded, and then stored as an encoded value in the memory 530. In any case, the operation of the white-box decryption block cipher 520 operates so that the input value x is invisible to an attacker. A secure function P 540 may fetch encoded input values f(x) from the memory 530. The secure function P 540 may first decode the input values. Next, the secure function P 540 may perform operations using the decoded input values. Any type numeric or logical operation or combinations thereof may be performed on these inputs. Such operations may be implemented using a lookup table or a series of lookup tables. The secure function P 540 next may encode the output using the encoding function f. In any case, the operation of the secure function P 540 operates so that the input value x and the output of the secure function P 540 is invisible to an attacker. The encoded output may then be stored again in the memory 530. In other embodiments, the secure function P 540 may operate directly on the encoded input(s) to directly produce an encoded output without any input decoding and output encoding. If an item stored in the memory is an output intended for the external source 510, a white-box encryption block cipher 550 may receive the encoded item from the memory 530. The white-box encryption block cipher 550 decodes the encoded item and then encrypts the output item for transmission to the external source 550. In any case, the operation of the white-box encryption block cipher 550 operates so that the underlying value of the encoded item is invisible to an attacker.

The software security module 500 may include numerous other secure functions P 540 that perform a variety of functions. These various software programs P may be combined to achieve more complex functionality. In such a case the memory 530 may store encoded data values from the various secure functions P. Such stored encoded data may be outputs from various secure functions P and inputs to other various secure functions allowing for the interoperation of the various secure functions while protecting the stored encoded data from attack. Also, data from the memory may be encoded by the white-box encryption block cipher 550 and stored as encrypted data. If the encrypted data is needed by one of the various secure functions P, then the encrypted data is input to the white-box decryption block cipher 520, resulting in the data being encoded by the encoding function f, and hence now usable by the secure function. Storing data encrypted by the white-box encryption block cipher 550 may be used when extra security is needed or for particularly sensitive information, especially when such information may remain in the memory for an extended period of time making it more susceptible to attack.

The embodiments described above result in various benefits. All values are stored encoded or encrypted in memory, thus protecting them. Further, during operations, all intermediate values remain encoded or encrypted. In order to import/export values into/out of the encoded memory, a table-based white-box block cipher may be used into which internally used encoding/decoding functions are merged. Further, all operations in secure functions P may be written as an obfuscated network of lookup tables. If some operation is executed multiple times, they may or may not be implemented by the same network of lookup tables. Also, if a value x is imported into or exported out of the software security module, then the white-box block cipher is used to decrypt/encrypt the input/output. This white-box bock cipher is merged with the encoding of x for use with the secure functions P. The use of the white-box block cipher on inputs and output hardens against having small block sizes for the internal encoding function, because it prevents a chosen plaintext attack. Performing a chosen plaintext attack on the white-box implementation is ineffective if the conventional block cipher underlying the white-box implementation is resistant to it. Furthermore, performing a chosen-plaintext attack on an internal encoding function f is not possible because an attacker has no access to the plain input of f.

A method according to the embodiments of the invention may be implemented on a computer as a computer implemented method, or in dedicated hardware, or in a combination of both. Executable code for a method according to the invention may be stored on a computer program medium. Examples of computer program media include memory devices, optical storage devices, integrated circuits, servers, online software, etc.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

A hardware system implementation of the embodiments of the invention may include hardware elements implementing the basic blocks of the white-box block cipher as well as the functions of the software programs P. These hardware elements may include, for example, lookup tables or finite state machines. These hardware elements may be interconnected to fully carry out the secure software implementation.

As used herein, the term "non-transitory machine-readable storage medium" will be understood to exclude a transitory propagation signal but to include all forms of volatile and non-volatile memory.

As used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of performing a secure function on an encrypted data value by a security module, comprising:
    receiving, from an external source, the encrypted data value by the security module, wherein the encrypted data value represents a data value that has been encrypted;
    using a white-box decryption block cipher to decrypt the encrypted data value and encoding the decrypted data value, wherein the data value in the encoded data value is invisible to an attacker;
    storing the encoded data value in a memory;
    using a secure program function module to perform the secure function on the encoded data value in the memory and producing an encoded result of the secure function by:
        decoding the encoded data value;
        performing the secure function on the data value to produce a result; and
        encoding the result, wherein the data value in the encoded data value and the result in the encoded result are invisible to the attacker;
        storing the encoded result of the secure function in the memory;
    using a white-box encryption block cipher to decode the encoded result in the memory and then encrypt the result, wherein the result in the encrypted result is invisible to the attacker; and
    sending the encrypted result to the external source.

2. The method of claim 1, wherein the encrypted data value is received from the memory in the security module, and further comprising storing the encrypted result in the memory.

3. The method of claim 1, wherein the white-box encryption block cipher and the white-box decryption block cipher use Advance Encryption Standard cryptography.

4. The method of claim 1, wherein the white-box encryption block cipher and the white-box decryption block cipher use Data Encryption Standard cryptography.

5. The method of claim 1, wherein the white-box encryption block cipher and the white-box decryption block cipher comprise a plurality of lookup tables.

6. The method of claim 5, wherein the lookup tables are hardware lookup tables.

7. The method of claim 5, wherein the lookup tables are software lookup tables stored in a memory and the white-box encryption block cipher and the white-box decryption block cipher are implemented on a processor.

8. The method of claim 1, wherein the white-box encryption block cipher and the white-box decryption block cipher comprise a plurality of finite state machines.

9. A security module for performing a secure function, comprising:
    a white-box decryption module configured to:
        receive, from an external source, an encrypted data value, wherein the encrypted data value represents a data value that has been encrypted;
        decrypt the encrypted data; and
        encode the decrypted data value, resulting in encoded data,
        wherein the data value in the encoded data value is invisible to an attacker;
    a memory configured to the store encoded data;
    a secure program function module configured to:
    perform a secure function on the encoded data value and produce an encoded result of the secure function by:
        decoding the encoded data value;
        performing the secure function on the data value to produce a result; and
        encoding the result, wherein the data value in the encoded data value and the result in the encoded result are invisible to the attacker;
        storing the encoded result of the secure function in the memory;
    a white-box encryption module configured to:
        decode the encoded result of the secure function; and
        encrypt the result, wherein the result in the encrypted result is invisible to the attacker; and;
        sending the encrypted result to the external source.

10. The security module of claim 9, wherein the encrypted data value is received from the memory and wherein the white-box encryption module is further configured to store the encrypted result in the memory.

11. The security module of claim 9, wherein the white-box encryption module and the white-box decryption module use Advance Encryption Standard cryptography.

12. The security module of claim 9, wherein the white-box encryption module and the white-box decryption module use Data Encryption Standard cryptography.

13. The security module of claim 9, wherein the white-box encryption module and the white-box decryption module comprise a plurality of lookup tables.

14. The security module of claim 9, wherein the white-box encryption module and the white-box decryption module comprise a plurality of finite state machines.

15. The security module of claim 9, wherein the encrypted data value is received from an external source, and further comprising sending the encrypted result to the external source.

16. The security module of claim 9, wherein the encrypted data value is received from the memory in the security module, and further comprising storing the encrypted result in the memory.

17. A non-transitory machine-readable storage medium encoded with instructions for execution by a security module for performing a secure function on an encrypted data value, the non-transitory machine-readable storage medium, comprising:

instructions for receiving, from an external source, the encrypted data value by the security module, wherein the encrypted data value represents a data value that has been encrypted;

instructions for decrypting the encrypted data value using a white-box decryption block cipher and encoding the decrypted data value, wherein the data value in the encoded data value is invisible to an attacker;

instructions for storing the encoded data value in a memory;

instructions for performing the secure function on the encoded data value in the memory and producing an encoded result of the secure function by:

decoding the encoded data value;

performing the secure function on the data value to produce a result; and encoding the result, wherein the data value in the encoded data value and the result in the encoded result are invisible to the attacker;

instructions for storing the encoded result of the secure function in the memory;

instructions for decoding the encoded result in the memory and then encrypting the result using a white-box encryption block cipher, wherein the result in the encrypted result is invisible to the attacker; and instructions for sending the encrypted result to the external source.

18. A method of producing an implementation of a cryptographic operation for performing a secure function on an encrypted data value by a security module, comprising:

producing a white-box implementation of a decryption operation that receives the encrypted data value, from an external source, that decrypts the encrypted data value, that encodes the decrypted data value, and that stores the encoded data value in a memory, wherein the encrypted data value represents a data value that has been encrypted and wherein the data value in the encoded data value is invisible to an attacker;

implementing a secure function on the encoded data value in the memory that produces an encoded result of the secure function by:

decoding the encoded data value;

performing the secure function on the data value to produce a result; and encoding the result, wherein the data value in the encoded data value and the result in the encoded result are invisible to the attacker;

storing the encoded result of the secure function in the memory;

producing a white-box implementation of an encryption operation that receives the encoded result, that decodes the encoded result, that encrypts the result, and that sends the encrypted result to the external source, wherein the result in the encrypted result is invisible to an attacker.

19. The method of claim 18, wherein the encrypted data value is received from the memory in the security module and wherein the white-box implementation of the encryption operation is configured to store the encrypted result in the memory.

20. The method of claim 18, wherein the white-box encryption implementation and the white-box decryption implementation use Advanced Encryption Standard cryptography.

21. The method of claim 18, wherein the white-box encryption implementation and the white-box decryption implementation operation use Data Encryption Standard cryptography.

22. The method of claim 18, wherein the white-box encryption implementation and the white-box decryption implementation comprise a plurality of lookup tables.

23. The method of claim 22, wherein the lookup tables are hardware lookup tables.

24. The method of claim 22, wherein the lookup tables are software lookup tables stored in a memory and the white-box encryption implementation and the white-box decryption implementation are implemented on a processor.

25. The method of claim 18, wherein the white-box encryption implementation and the white-box decryption implementation comprise a plurality of finite state machines.

* * * * *